United States Patent
Williams, Jr.

(10) Patent No.: US 12,005,629 B2
(45) Date of Patent: Jun. 11, 2024

(54) HAND-HELD SQUEEGEE WITH RING LOOP

(71) Applicant: Robert D. Williams, Jr., Bowdon, GA (US)

(72) Inventor: Robert D. Williams, Jr., Bowdon, GA (US)

(*) Notice: Subject to any disclaimer, the term of this patent is extended or adjusted under 35 U.S.C. 154(b) by 216 days.

(21) Appl. No.: 17/000,050

(22) Filed: Aug. 21, 2020

(65) Prior Publication Data

US 2022/0055284 A1 Feb. 24, 2022

(51) Int. Cl.
*B29C 63/00* (2006.01)
*A47L 13/11* (2006.01)
*B25G 1/10* (2006.01)
*B29C 63/02* (2006.01)

(52) U.S. Cl.
CPC .......... *B29C 63/0047* (2013.01); *A47L 13/11* (2013.01); *B25G 1/102* (2013.01); *B29C 2063/027* (2013.01)

(58) Field of Classification Search
USPC .......................................................... D32/41
See application file for complete search history.

(56) References Cited

U.S. PATENT DOCUMENTS

| | | | | | |
|---|---|---|---|---|---|
| 4,827,557 | A | * | 5/1989 | Siler, Jr | G02C 13/006 15/245.1 |
| D321,421 | S | * | 11/1991 | Zettle | D32/41 |
| D481,501 | S | * | 10/2003 | Richter | D32/46 |
| D547,511 | S | * | 7/2007 | Libman | D32/49 |
| D627,532 | S | * | 11/2010 | Yang | D32/41 |

* cited by examiner

*Primary Examiner* — Barbara J Musser
(74) *Attorney, Agent, or Firm* — GARDNER GROFF & GREENWALD, PC

(57) ABSTRACT

A hand-held squeegee for applying or installing wraps and/or films to surfaces. The hand-held squeegee includes a blade portion, a handle portion, and a ring loop portion. The hand-held squeegee is placed over or around a user's finger so that the squeegee can rotate about the user's finger between use and non-use, and is conveniently secured to the user's hand even when it is not actively in use by the user or when the user is using another tool.

14 Claims, 6 Drawing Sheets

HAND-HELD SQUEEGEE WITH RING LOOP

TECHNICAL FIELD

The present invention relates generally to the field of squeegees for applying films and wraps, and more particularly to a hand-held squeegee with a ring loop for applying films and other wraps to surfaces, such as for example, surfaces of automotive vehicles.

BACKGROUND

Applying films and/or wraps to automotive vehicles requires the use of several different tools in quick succession. One such tool is a squeegee which is generally used to apply vinyl wrap to a vehicle and force out any air pockets trapped beneath the film during the installation thereof. Once the wrap is appropriately installed over a desired section of the vehicle, additional wrap overhanging the desired section is trimmed using a cutting utensil, such as a utility knife. In some cases, the wrap must be cut to expose certain features of the vehicle or to match the vehicle's contours. In other cases, a heat gun is used to heat certain sections of the wrap to encourage the wrap to stretch or become more flexible.

Generally, a proper application of films or wraps to a vehicle requires the use of such equipment in successive combinations, and it is common for those using the equipment to either store them away between uses or utilize unsanitary methods of temporarily holding the unused equipment elsewhere, such as in their mouth. For example, once the squeegee is used to remove any air trapped under the wrap during installation, a technician applying the wrap often will trim the wrap using a utility knife and will be required to store away the squeegee until it is needed again. Commonly, the technician will place the squeegee in a tool pouch, to the side, on the ground, or on another surface. However, the squeegee can pick up dirt or other particles from the tool pouch, ground or surface and scratch or tear the wrap upon subsequent use. Having to store away and switch between tools is also time consuming and inefficient. Alternatively, some technicians will hold the squeegee in his/her mouth so he/she can quickly access the squeegee again when needed. However, this is unsanitary and unsafe for the technician.

Accordingly, it can be seen that a need exists for an improved squeegee which can improve the efficiency and sanitary condition of its use in applying films and/or wraps to automotive vehicles and other similar applications. It is to the provision of a hand-held squeegee meeting these and other needs that the present invention is primarily directed.

SUMMARY

In a first example form, the present invention provides a hand-held squeegee for applying thin, flexible films, pre-mask materials, and/or wraps. The squeegee includes a blade portion and a handle portion. The handle portion supports the blade portion and is attached to the blade portion and the blade extends therefrom. A loop portion is attached to the handle portion or, alternatively, formed in the handle portion and is adapted to be slipped over a finger of a user and worn by the user for temporarily storing the squeegee while using some other tool or doing some other task.

Optionally, the hand-held squeegee includes a blade cover. In one form, blade cover is made of felt. In another form, the blade cover is made of rubber. In still another form, the blade cover is made of silicone.

Also optionally, the hand-held squeegee includes a storage port. The storage port is adapted for receiving and securing another hand-held tool, such as for example a utility knife commonly used during installation of wraps, pre-masking materials, and/or films.

In one aspect, the hand-held squeegee is formed as a unitary device or apparatus. In another aspect, the squeegee is an assembly of two or more components.

In another example form, the present invention relates to a squeegee having a blade portion and a handle portion. The handle portion is formed by a first side guard and a second side guard. Each of the first and second side guards has a first end and a second end, and the two side guards are connected to each other by their respective first ends. At the second ends of the first and second side guards, the two side guards are connected by a finger loop portion. The first side guard, second side guard, and the finger loop portion form a continuous loop through which a user can slip the user's finger and retain the squeegee around the user's finger during use of the squeegee and other tools. The blade portion extends away from the handle portion and is tapered down to an edge of the blade portion.

Preferably, the first and second side guards are contoured inwardly between their respective first and second ends.

Preferably, the squeegee further comprises a blade cover made from either felt, rubber, or silicone.

Preferably, the squeegee further comprises a webbing between the first and second side guards, the webbing comprising an opening adapted for receiving and securing another hand implement, such as for example a utility knife.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
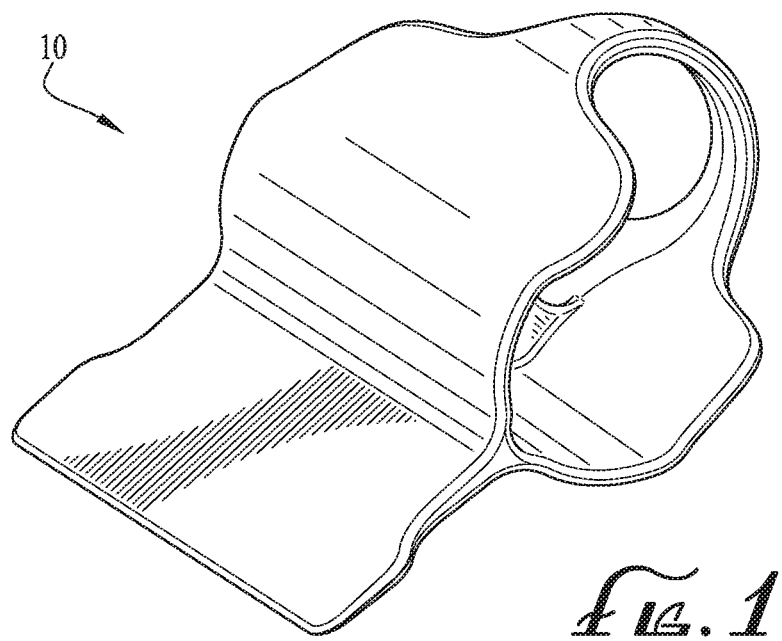
FIG. 1 is a perspective view of a hand-held squeegee with a ring loop according to an example embodiment of the present invention.
Figure 2:
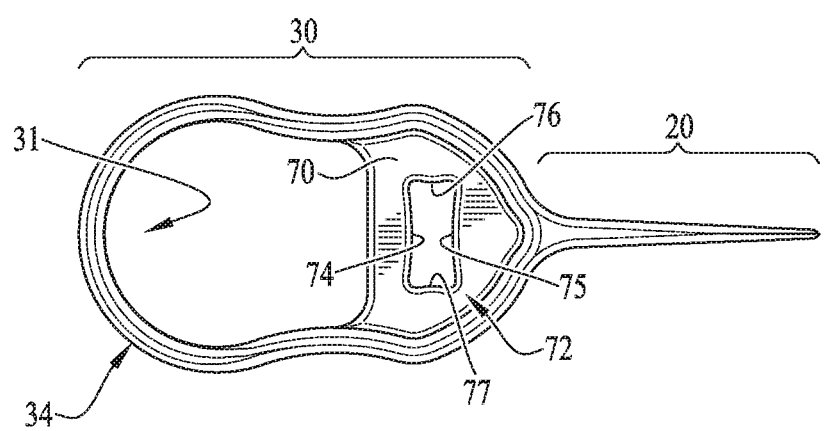
FIG. 2 is a side, end elevation view of the hand-held squeegee of FIG. 1.
Figure 3:
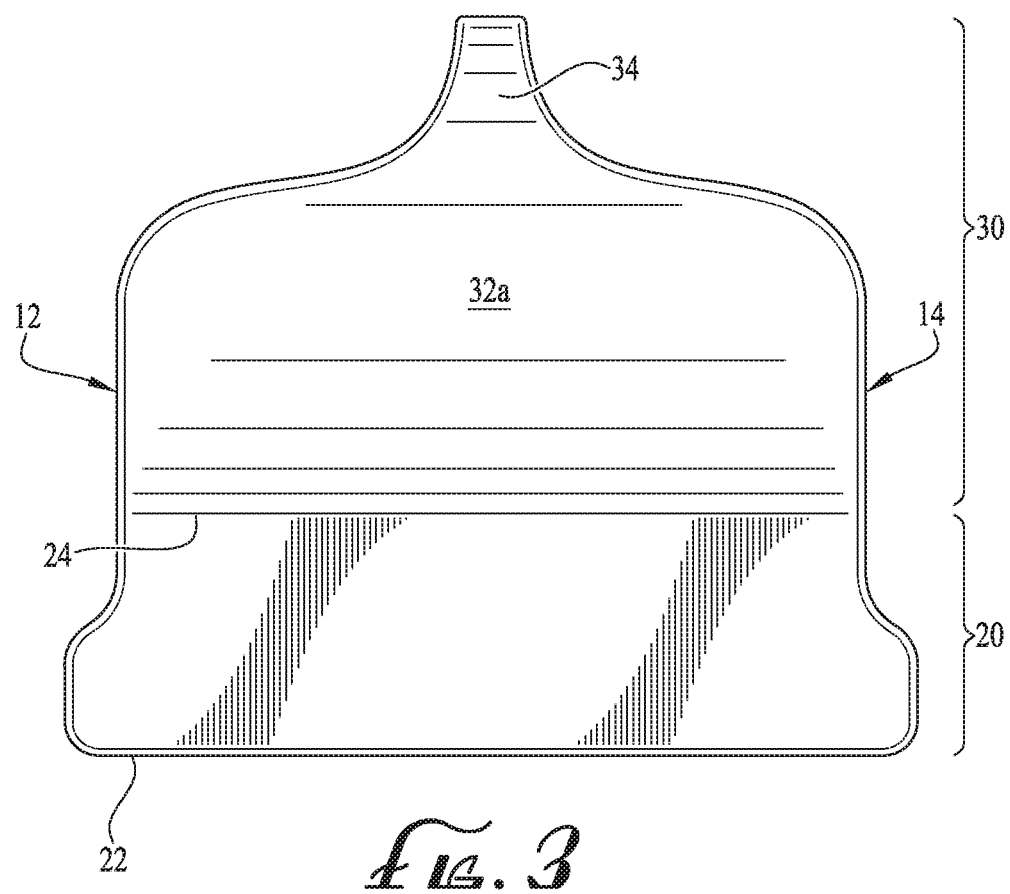
FIG. 3 is a front elevation view of the view of the hand-held squeegee of FIG. 1.

With reference now to the drawing figures, wherein like reference numbers represent corresponding parts throughout the several views, FIGS. 1-3 show a hand-held squeegee 10 with a ring loop for applying thin, flexible films and/or wraps according to an example embodiment of the present invention. The squeegee includes a blade portion 20 and a handle portion 30. The handle portion 30 is attached to the blade portion 20, and the blade portion 20 extends from and is supported by the handle portion 30. The handle portion includes an opening 31, extending between a first opening end 12 and a second opening end 14, through which a user of the squeegee can insert or slip a finger and retain the squeegee secured to the user's hand while handling other tools or hand implements.

The blade portion 20 includes a transition end or seam 24 and a blade end or edge 22. The blade portion is connected to the handle portion 30 at its transition end 24 and extends transversely therefrom to the blade end 22. In example embodiments, the length of the blade portion 20 between its transition end 24 and blade end or tip 22 is between about one inch and five inches. Generally, the blade portion is tapered wherein the blade portion is thicker at its transition end 24 than at its blade end/tip 22.

In other example embodiments, the blade portion 20 may comprise a blade end that is thicker than the transition end or the blade portion may comprise a substantially uniform thickness throughout. In the depicted embodiment, the blade portion 20 further comprises an expanded or extended T-profile wherein one half of the blade portion comprising the blade end 22 is wider than the other half of the blade portion comprising the transition end/tip 24, as best shown in FIG. 3. However, those skilled in the art will appreciate that other dimensions and/or profiles can be employed as well.

Figure 4:
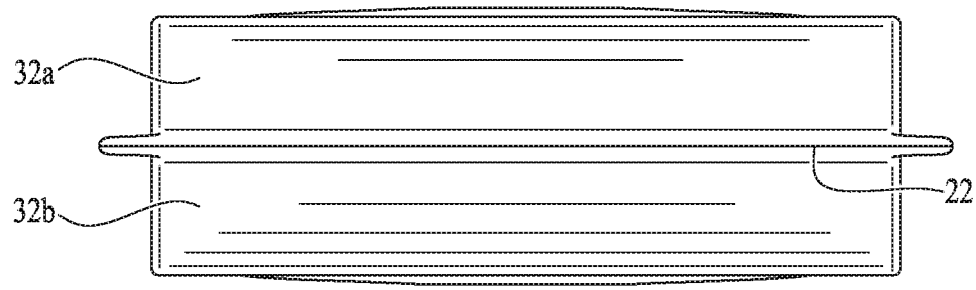
FIG. 4 is a bottom view of the view of the hand-held squeegee of FIG. 1.
Figure 5:
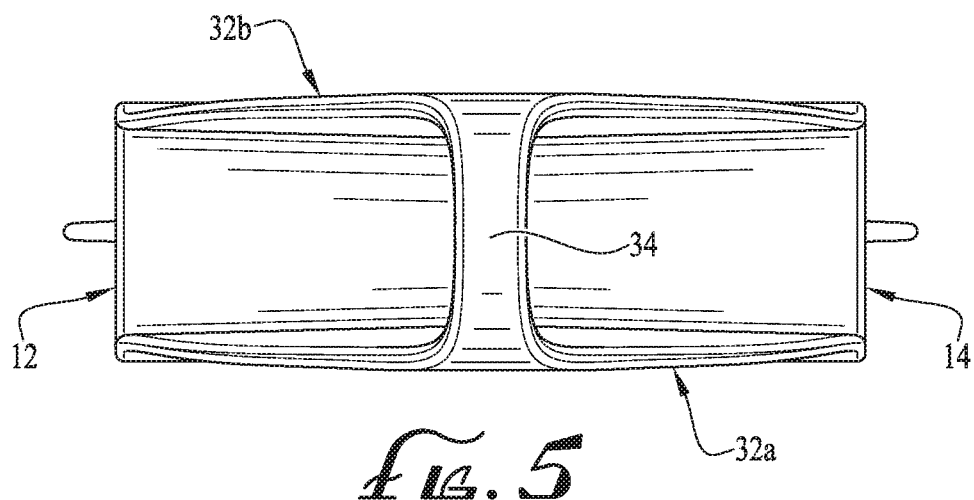
FIG. 5 is a top view of the view of the hand-held squeegee of FIG. 1.
Figure 7:
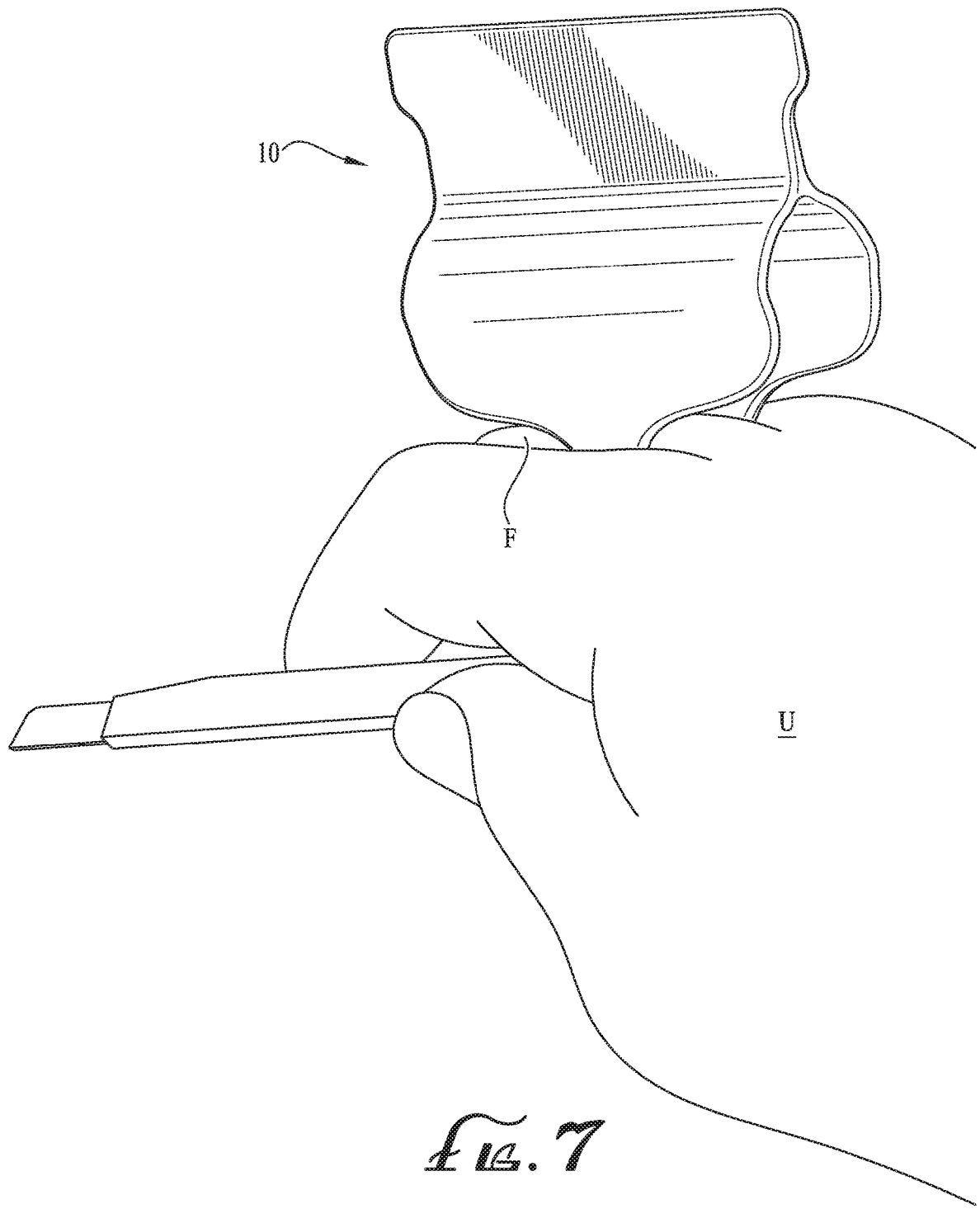
FIG. 7 is a schematic perspective view showing the hand-held squeegee of FIG. 1 on a user's hand with the squeegee blade stored facing up above the user's knuckles.

As shown in FIGS. 4-5, the handle portion 30 comprises a first side guard or portion 32a, a second side guard or portion 32b, and a ring loop portion 34. Generally, the first and second side guards extend from the transition end 24 of the blade portion 20 in generally opposing directions. The ring loop portion 34 is attached to or formed in the handle portion. The ring loop portion 34 extends between and connects the first and second side guards 32a, 32b, and is adapted to be slipped over a finger of the user and the squeegee worn by the user. In example embodiments, the ends of the first and second side guards opposite the transition end 24 are connected by the ring loop portion 34 whereby the first side guard, second side guard, and the ring loop portion form a continuous loop, as best shown in FIG. 2. The ring loop portion 34 is narrower than the width of the side guards 32a and 32b to allow the user to close or fold the user's finger when inserted through the handle portion 30 during use, as described in more detail below. The ring loop portion 34 also extends beyond the side guards to provide clearance for the backside of the user's hand and other fingers F when the squeegee 10 is rotated to the back of the user's hand during non-use, as best shown in FIG. 7.

Figure 6:
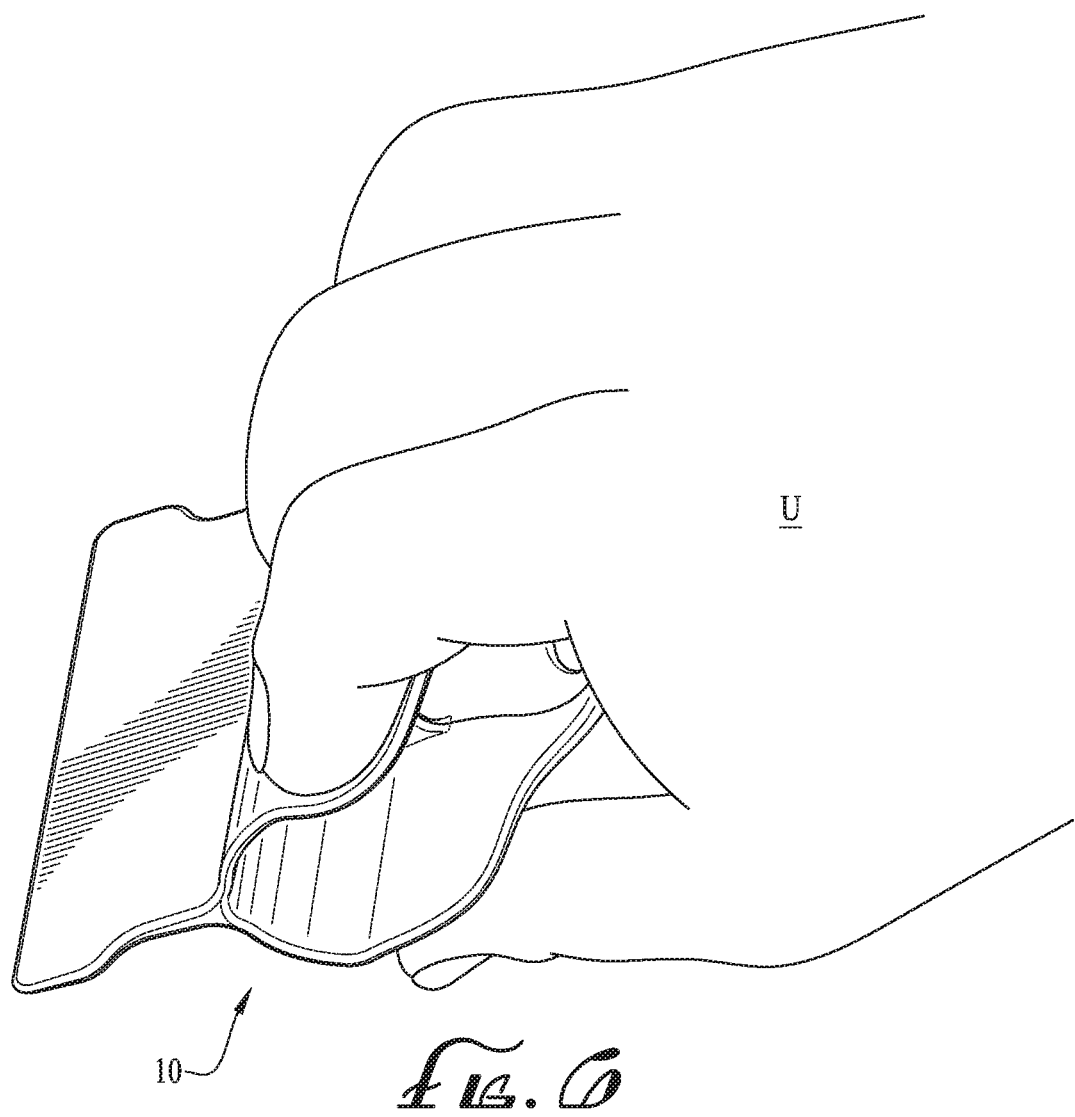
FIG. 6 is a schematic perspective view showing the hand-held squeegee of FIG. 1 on a user's hand with a squeegee blade facing down in use on a surface.

In the depicted embodiment, the ring loop portion 34 is positioned between about the center of side guards 32a and 32b. The corners adjacent both the ring loop portion 34 and side guards 32a and 32b are contoured or filleted to improve the structural integrity and eliminate sharp corners. Furthermore, the side guards include inwardly contoured portions between the transition end and the ring loop to provide a better grip for the user, as best shown in FIGS. 2 and 6. However, those skilled in the art will appreciate that other configurations, profiles, and/or dimensions can be employed as well.

Figure 8:
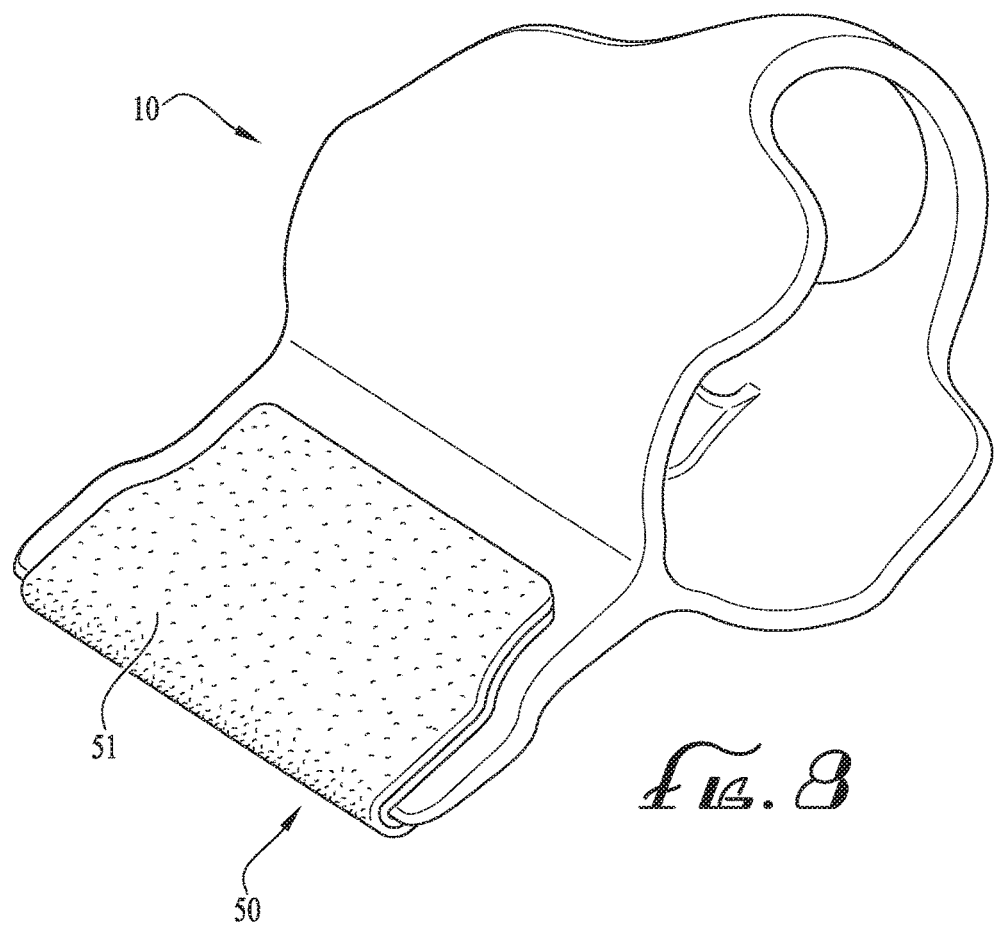
FIG. 8 is a perspective view of a hand-held squeegee with a ring loop according to another example embodiment of the present invention and shown having a blade cover portion.
Figure 9:
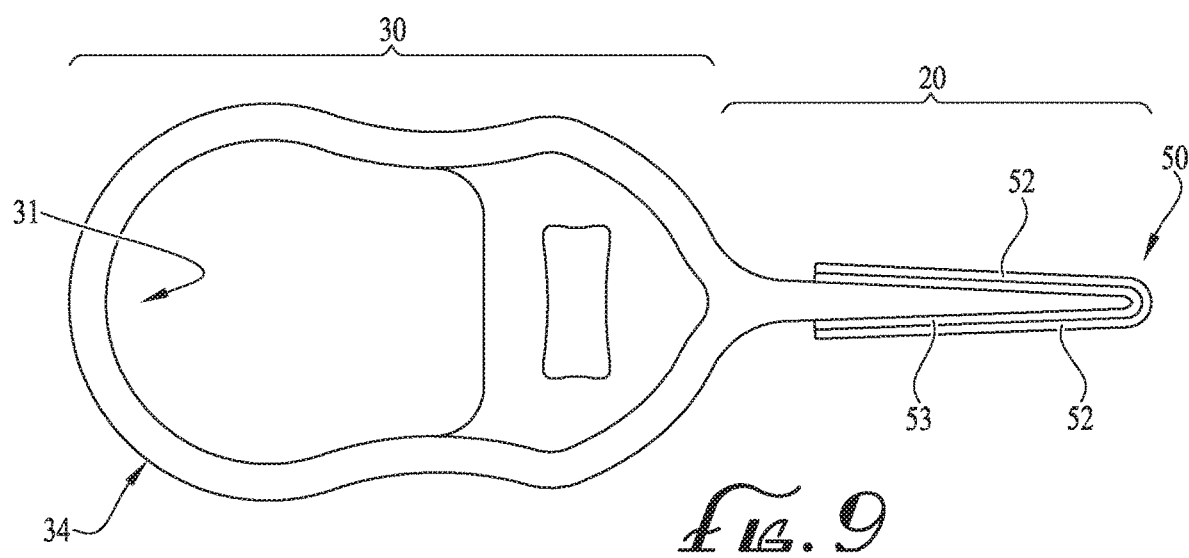
FIG. 9 is a side, end elevation view of the hand-held squeegee of FIG. 8.

As shown in FIGS. 8 and 9, in some example embodiments, the squeegee 10 may further include a blade cover portion or liner 50 secured to or formed on the blade edge 22. The blade cover portion 50 can be made from leather, fabric, rubber, silicone, faux suede, neoprene, plastic and/or other similar materials and laminations or combinations thereof, and be configured to be removably or permanently secured to the blade edge 22. For example, the blade cover portion 50 may be made from felt material comprising a permanent, adhesive backing or a silicone material with a removable, hook-and-loop backing. In the example shown in these figures, the blade cover portion 50 can be made from an artificial or faux suede or suede-like material 51 having an outer layer 52 adhered or bonded to an inner layer 53. For example, the outer layer 52 bears a suede-like surface texture, while the inner layer 53 can be a neoprene layer provided with an adhesive or adhesive backing. The adhesive allows the inner layer to be removably or permanently adhered to the blade edge 22. Further, the outer layer may be laminated to the inner layer. In example embodiments, the outer suede-like layer may be laminated to the neoprene inner layer whereby the neoprene layer provides additional padding to the more delicate outer, suede layer and improves the longevity of the overall blade cover portion. The additional padding assists in maintaining a more consistent pressure and contact between the working application surface and the blade cover portion. It will be appreciated by those skilled in the art that other combinations of materials for the blade cover portion and methods of attaching or securing the blade cover portion to the blade edge can be utilized as well.

Figure 10:
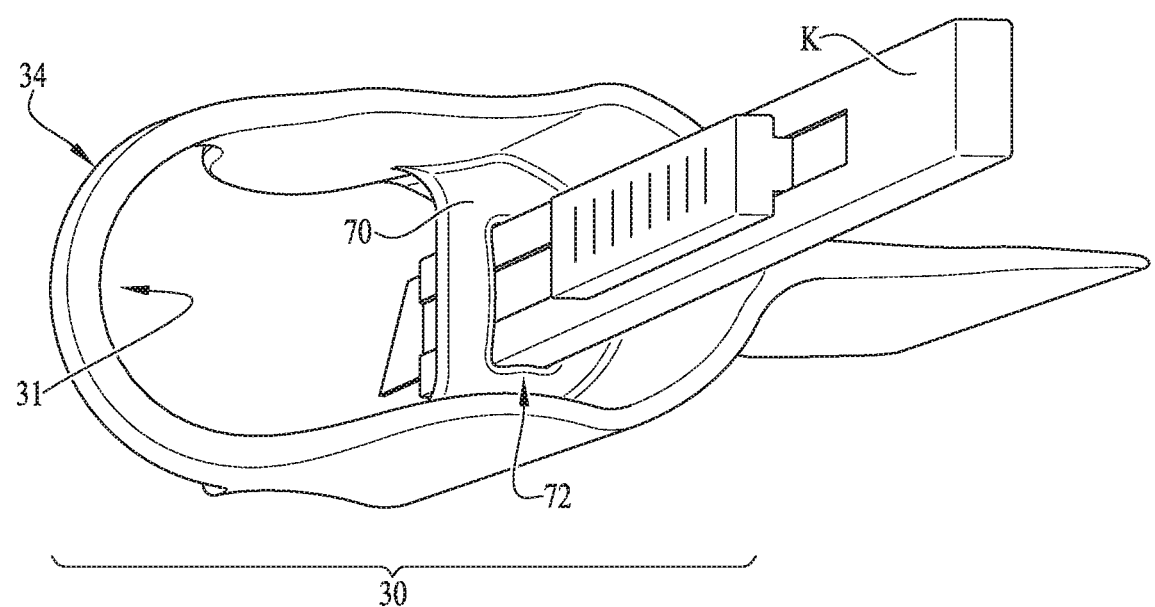
FIG. 10 shows a utility knife removably secured in a storage port formed on a webbing of the hand-held squeegee of FIG. 1.

In yet other example embodiments, the squeegee 10 may further comprise a webbing or partition 70, as best shown in FIGS. 2 and 10. The webbing 70 generally spans between the first and second side guards 32a, 32b. In example embodiments, the webbing 70 extends transversely between the first and second side guards approximately about the center between its first opening end 12 and second opening end 14 of the handle portion 30. However, it will be appreciated by those skilled in the art that the webbing 70 can be positioned anywhere along the length of the opening 31 formed between first and second side guards 32a, 32b. In example embodiments, the webbing 70 extends only partially within the opening 31 extending from the transition edge 24 toward the ring loop portion 34. The opening 31 is thereby only partially obstructed by the webbing 70 and the user is able to insert his/her finger through the opening between the webbing and the ring loop portion 34. The webbing 70 provides additional support for the structure of the handle portion 30 and improves its rigidity.

In some embodiments, webbing 70 further comprises a storage opening or port 72 adapted for receiving and temporarily securing or storing another hand-held tool, such as for example a utility knife K commonly used during the installation of wraps, pre-mask materials, and/or films, as shown in FIG. 10. In the depicted embodiment, the storage port 72 has a generally rectangular profile with sides 74, 75, 76, and 77. However, it will be appreciated by those skilled in the art that the storage port can comprise various shapes and profiles.

In some example embodiments, at least one of the sides 74, 75, 76, and 77 may comprise an arcuate edge curved toward the center of the storage port. The arcuate side is adapted to resiliently bend away when a tool is inserted through the storage port and apply pressure against the tool securing the tool in the storage port. In the depicted embodiment, all four sides 74, 75, 76, and 77 comprise arcuate edges curved towards the center of the storage port wherein every side is adapted to resiliently bend away as another tool is inserted through the storage port. In still other example embodiments, the edges of the arcuate sides can be formed from or affixed with a non-slip material, such as for example rubber or polyvinyl chloride (PVC), providing additional slip-resistance or friction to prevent any secured tool within the storage port from being accidentally or unintentionally slipping out or removed from therein.

In example embodiments, the squeegee 10 is formed as a singular or unitary device or apparatus. The squeegee preferably may be made from various materials, especially rigid or semi-rigid polymers. In other embodiments, the squeegee may comprise an assembly of two or more components secured to one another using adhesives; welding; mechanical assembly means, such as for example, snap-fit mechanisms; and/or other similar methods of mechanical joining known in the art. For example, the blade portion 20 and handle portion 30 may be distinct components secured to one another to form the squeegee. Alternatively, the squeegee may comprise two symmetrical halves secured to one another. One or more edges and/or corners of the squeegee may be rounded or radiused to remove sharp edges or corners that can potentially tear or scratch the wrap or film during installation.

According to example methods of use, the squeegee 10 is used to apply wraps and/or films to a surface, such as for example, the exterior surface of an automotive vehicle. Generally, the squeegee is slipped over or around one of the user's fingers by inserting a finger F of the user U through the opening formed by the side guards 32a and 32b and the ring loop portion 34. The squeegee is allowed to rotate about the user's finger so that the squeegee can be rotated away to the back-side of the user's hand, and the blade portion 20 rotated safely away from the applicable surface, when the squeegee is not in use, as shown in FIG. 7. When the squeegee is needed for working, it is rotated back around the user's finger to the palm-side of the user's hand and its handle portion 30 is gripped securely between the user's fingers and thumb, as shown in FIG. 6. The contoured profile of the handle portion 30 provides a grip and helps prevent accidental slippage or misuse. The hand-held squeegee according to example embodiments of the present invention allows the squeegee to be worn around the user's finger so that it need not be stored away between uses or held in any unsanitary manner while the user U is using other tools. Additionally, storage port 72 provides the user with a convenient alternative for storing at least one of the other tools, such as for example a utility knife, when either the squeegee is in use and/or the at least one of the other tools is not in immediate use.

While the invention has been described with reference to example embodiments, it will be understood by those skilled in the art that a variety of modifications, additions and deletions are within the scope of the invention, as defined by the following claims.

What is claimed is:

1. A squeegee comprising:
a blade portion and a handle portion, the handle portion comprising a first side guard and a second side guard,
wherein the first side guard has a first end and a second end and the second side guard has a first end and a second end,
wherein the first end of the first side guard is connected to the first end of the second side guard, and the second end of the first side guard and the second end of the second side guard are connected by a finger loop portion,
wherein the blade portion extends from the handle portion to an edge of the blade portion opposite the handle portion, the blade portion being tapered from the handle portion to the edge of the blade portion opposite the handle portion, and
wherein the handle portion and the finger loop portion form a continuous loop for receiving a finger of a user and wherein the squeegee is an assembly of a plurality of components.

2. The squeegee of claim 1, wherein the squeegee further comprises a blade cover.

3. The squeegee of claim 2, wherein at least a portion of the blade cover is made from felt.

4. The squeegee of claim 2, wherein at least a portion of the blade cover is made from rubber or silicone.

5. The squeegee of claim 2, wherein at least a portion of the blade cover is made from suede or a suede-like material.

6. The squeegee of claim 1, wherein a loop portion extends beyond the handle portion.

7. The squeegee of claim 1 further comprising a storage port wherein the storage port is adapted for receiving and holding a hand-held tool.

8. The hand-held squeegee of claim 1 further comprising a webbing between the first and second side guards wherein the webbing comprises an opening adapted for receiving and securing another hand implement.

9. A squeegee comprising:
a blade portion and a handle portion, the handle portion comprising a first side guard and a second side guard,
wherein the first side guard has a first end and a second end and the second side guard has a first end and a second end,
wherein the first end of the first side guard is connected to the first end of the second side guard, and the second end of the first side guard and the second end of the second side guard are connected by a finger loop portion, wherein the blade portion extends from the handle portion to an edge of the blade portion opposite the handle portion, the blade portion being tapered from the handle portion to the edge of the blade portion opposite the handle portion, and wherein the handle portion and the finger loop portion form a continuous loop for receiving a finder of a user, the squeegee further comprising a blade cover portion and a webbing between the first and second side guards wherein the webbing comprises an opening adapted for receiving and securing another hand implement.

10. The squeegee of claim 9, wherein the squeegee is an assembly of a plurality of components.

11. The hand-held squeegee of claim 9, wherein the blade cover portion is made from felt.

12. The hand-held squeegee of claim 9, wherein the blade cover portion is made from silicone or rubber.

13. The hand-held squeegee of claim 9, wherein the blade cover portion comprises suede or a suede-like material.

14. The hand-held squeegee of claim 13, wherein the suede-like material is laminated to a neoprene material.

\* \* \* \* \*